United States Patent Office 3,088,553
Patented May 7, 1963

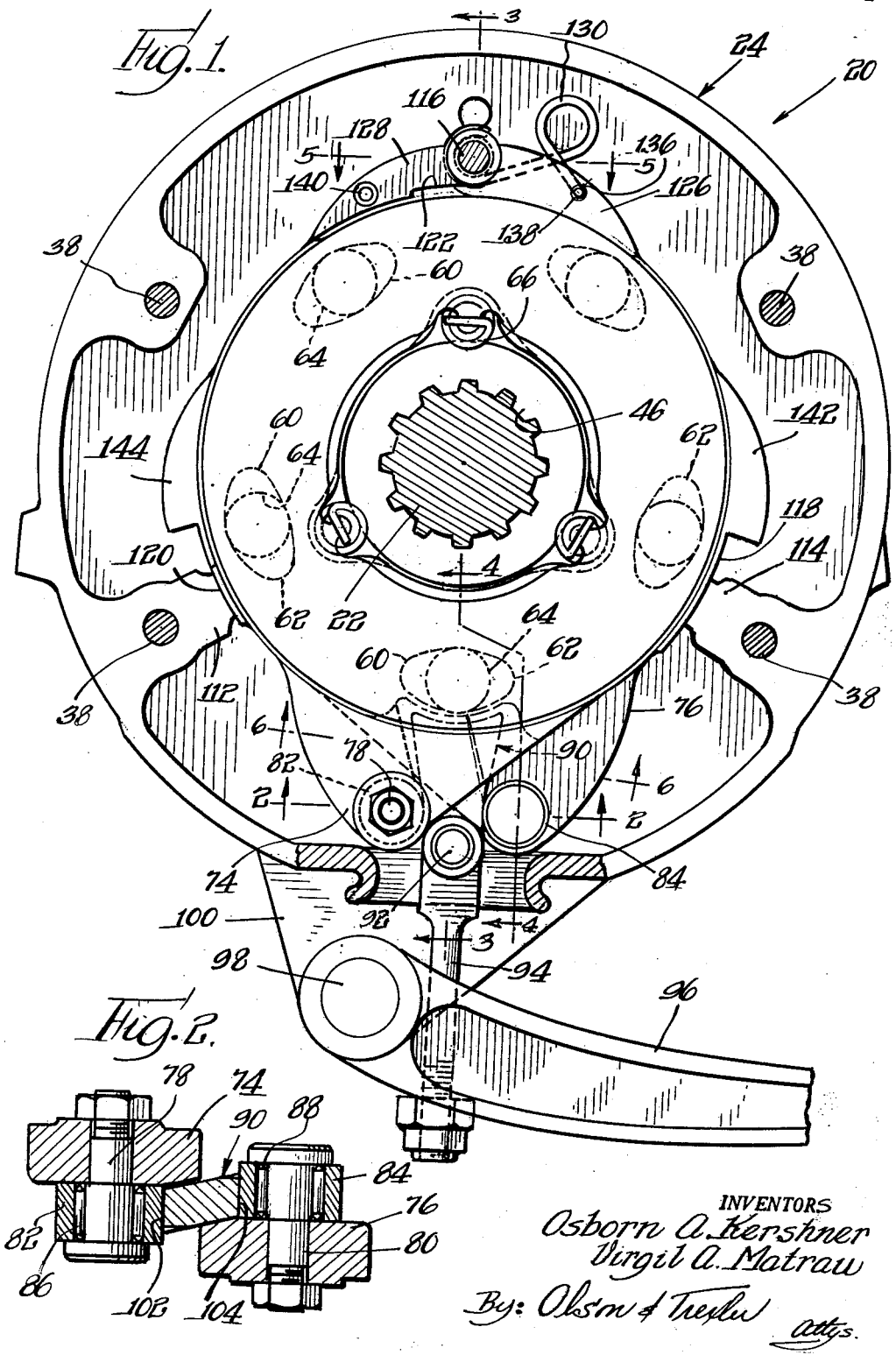

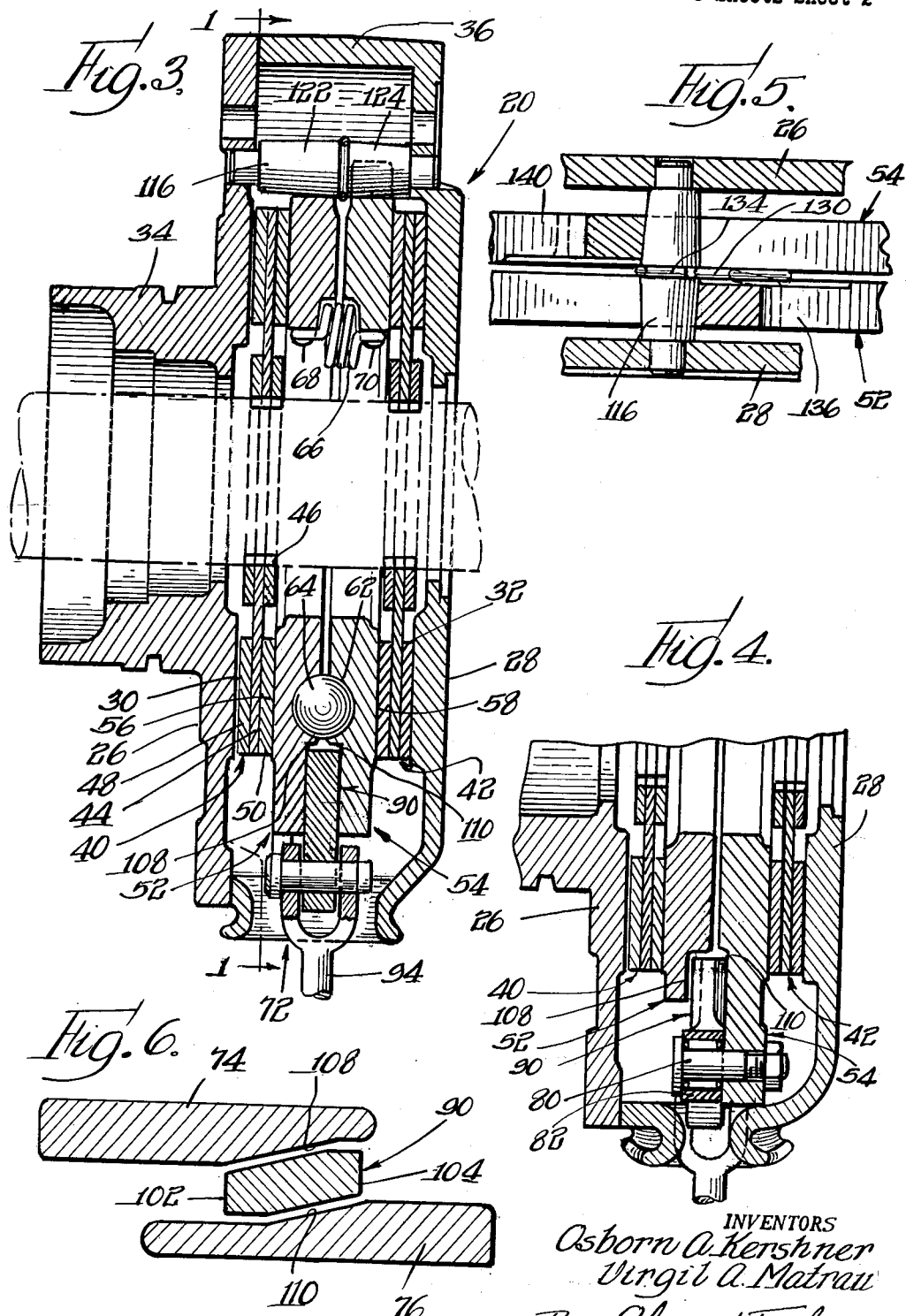

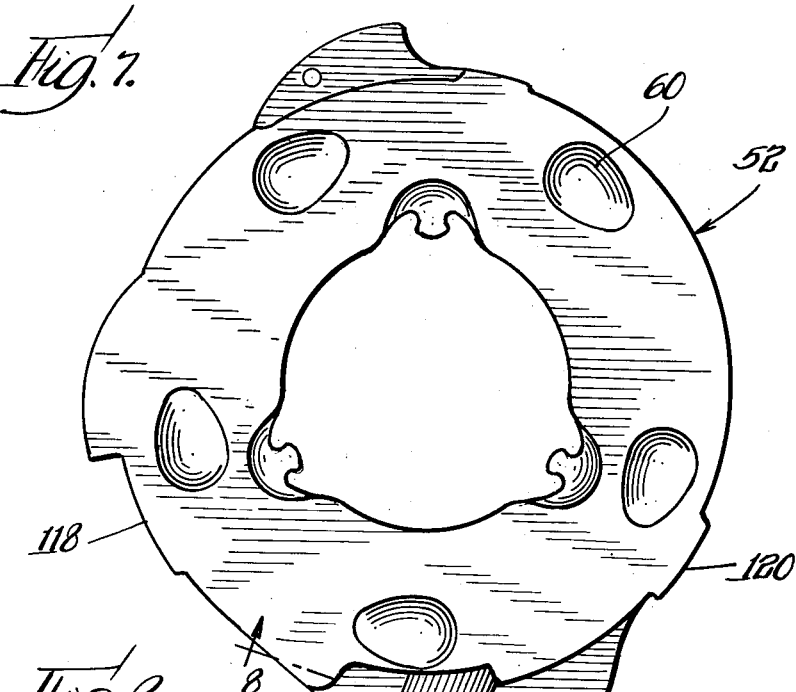
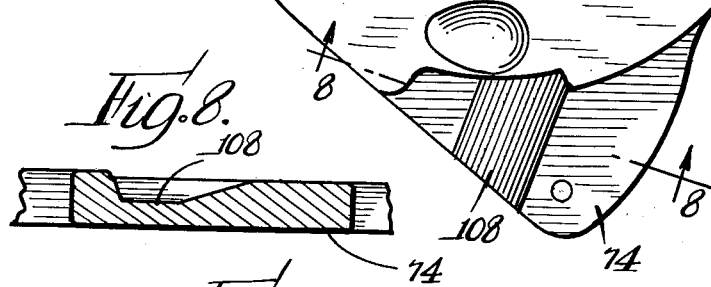
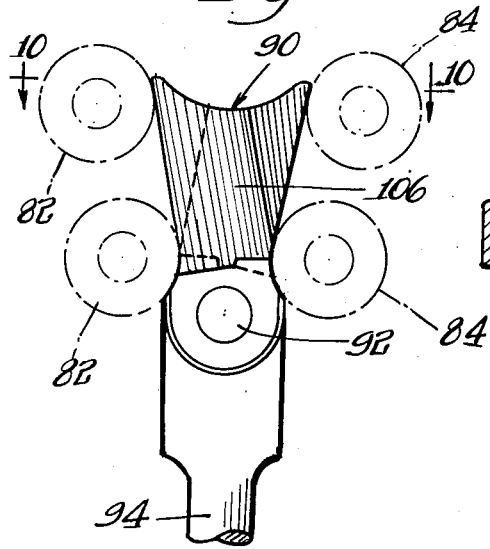
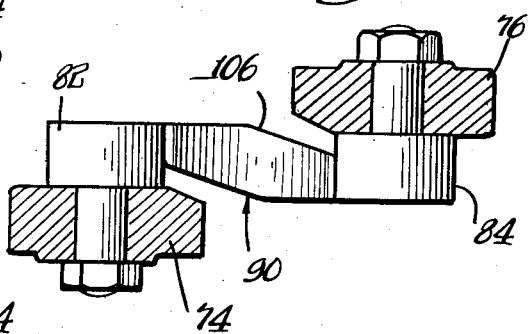

3,088,553
DISC BRAKE
Osborn A. Kershner, St. Joseph, and Virgil A. Matrau, Watervliet, Mich., assignors, by mesne assignments, to Lambert Brake Corporation, St. Joseph, Mich., a corporation of Michigan
Filed Sept. 8, 1960, Ser. No. 54,610
11 Claims. (Cl. 188—72)

The present invention relates to a novel brake structure, and more particularly to a novel disc type brake structure.

Brake structures of the type contemplated herein have heretofore been provided for use in many installations such as in tractors, trucks, airplanes and other vehicles as well as other types of equipment wherein there is a rotary part such as a shaft or the like to be controlled. Such heretofore provided brake structures have, in general, performed satisfactorily. However, it is an important object of the present invention to provide a novel disc type brake structure having substantial structural and functional advantages over heretofore proposed structures.

More specifically, it is an important invention to provide a novel disc type brake which is constructed so that its overall size may be reduced while its braking action is improved whereby the brake unit is suitable for a wider variety of installations, particularly those installations wherein space requirements are exacting.

A further important object of the present invention is to provide a novel disc type brake unit which is constructed so that the braking action provided thereby is greatly increased as compared with heretofore proposed brake structures of the same general type.

Still another object of the present invention is to provide a novel disc type brake unit of the above described type which is simplified and may be more economically produced and which at the same time is constructed so as to reduce wear whereby the effective working life and reliability of the unit is substantially increased.

Other objects and advantages will become apparent from the following description and the accompanying drawings wherein:

FIG. 1 is a sectional view taken generally along line 1—1 in FIG. 3;

FIG. 2 is a fragmentary sectional view taken along line 2—2 in FIG. 1;

FIG. 3 is a sectional view taken along line 3—3 in FIG. 1;

FIG. 4 is a fragmentary sectional view taken generally along line 4—4 in FIG. 1;

FIG. 5 is a fragmentary sectional view taken along line 5—5 in FIG. 1;

FIG. 6 is a fragmentary sectional view taken along line 6—6 in FIG. 1;

FIG. 7 is an elevational view showing one of the actuating disc members used in the brake unit of the present invention;

FIG. 8 is a fragmentary sectional view taken generally along line 8—8 in FIG. 7;

FIG. 9 is a partially schematic view showing a portion of the operation of the brake unit contemplated herein; and FIG. 10 is a fragmentary sectional view taken generally along line 10—10 in FIG. 9.

Referring now more specifically to the drawings wherein like parts are designated by the same numerals throughout the various figures, a disc type brake unit 20 is shown in FIGS. 1 and 3 in a form which is particularly suitable for installation in a tractor. However, it will be appreciated that the structure may be readily adapted for use in other installations. Thus while the brake unit is shown assembled with a rotary tractor shaft 22 which is to be controlled, it is to be understood that the unit may be associated with any other desired relatively rotatable member corresponding to the tractor shaft 22 in other installations.

The unit comprises housing means 24 which, in the embodiment shown, is adapted to be bolted or otherwise fixed to the frame of the tractor or the like, not shown. In other installations it is, of course, possible that the housing means may be modified so that it is rotatable while the central shaft is fixed. In any event, the housing means includes a pair of opposed end plate members 26 and 28 respectively presenting annular friction surfaces 30 and 32. In the embodiment shown the end plate member 26 merges with an integral hub portion 34 which provides support means for bearings and the like, not shown, associated with the shaft 22. The opposite end plate member 28 is provided with a peripheral laterally extending flange 36 which abuts the periphery of the end plate member 26 for substantially completely enclosing the interior mechanism of the unit. A plurality of screws or bolts 38 extend through aligned apertures in the plate members for securing the plate members together and to the frame of the tractor or other apparatus.

Referring particularly to FIGS. 1 and 3, it is seen that the mechanism within the housing comprises a pair of friction disc assemblies 40 and 42 respectively disposed for cooperative engagement with the friction surfaces 30 and 32. Each of the friction disc assemblies includes a central disc member 44 having splined hub means 46 around its inner margin for cooperative engagement with the splined shaft 22. Annular bands 48 and 50 of friction material are disposed around outer marginal portions of the disc 44.

Disposed between the friction disc assemblies 40 and 42 is a pair of identical and oppositely disposed actuating discs 52 and 54. These actuating discs are respectively provided with friction surfaces 56 and 58 and are adapted to be spread apart in the manner described below for engaging the friction disc assemblies and forcing the friction disc assemblies into engagement with the friction surfaces on the housing end plate members.

As shown in FIGS. 1, 3, 4 and 7 the actuating disc 52 is provided with a plurality of annularly spaced inclined cam surfaces or ball seats 60. The actuating disc 54 is provided with identical and oppositely disposed ball seats 62 and balls 64 are disposed between each pair of opposed and oppositely extending ball seats 60 and 62. Thus upon relative rotation of the actuating discs 52 and 54 from their fully retracted positions shown in FIGS. 1 and 3, the balls 64 will ride up on the cam surfaces so as to force the actuating discs apart and thereby clamp the friction disc assemblies between the opposing pairs of friction surfaces on the actuating discs and the housing. Since, of course, rotation of the actuating discs is limited in the manner described below, spreading of the actuating discs results in a stopping or braking of the rotation of the friction disc assemblies and the shaft or other part interconnected therewith.

In order to return the actuating discs to and retain the actuating discs in the retracted positions shown in FIGS. 1 and 3, tension springs 66 are connected between pairs of ears 68 and 70 extending inwardly from inner margins of the discs 52 and 54. In order to rotate the actuating discs relative to each other for spreading the discs and energizing the brake, means 72 is provided, which means is shown in whole or in part in FIGS. 1–3, 6, 9 and 10. More specifically, the actuating discs 52 and 54 respectively include radially outwardly extending integral and oppositely disposed ears 74 and 76. Stub shafts 78 and 80 are respectively secured to outer end portions of the ears 74 and 76 and project in opposite directions. A roller or cam follower 82 is mounted on the shaft 78 and an identical roller or cam follower 84 is carried by the shaft 80. As shown in FIG. 2, these rollers preferably include antifriction or bearing means 86 and 88.

An actuating wedge or cam member 90 is disposed between the rollers 82 and 84 and is arranged for radial movement with respect to the actuating discs. An outer end of the cam member is pinned or otherwise pivotally connected as at 92 to a link 94 which in turn is connected to an actuating lever 96. An end of the actuating lever 96 is pivotally supported on a shaft 98 which is carried by a bracket 100. The bracket 100 is integrally formed with or otherwise connected to the housing member 28 as indicated in FIG. 1. However, it will be understood that the bracket 100 could alternatively be secured to the housing member 26 or even to a fixed portion of the apparatus with which the brake unit is assembled. The wedge or cam member 90 is provided with cam surfaces or edges 102 and 104 which taper toward the radially outer end of the cam member. Thus, when the actuating lever 96 is pivoted in a clockwise direction, as shown in FIG. 1, the link 94 serves to pull the cam member radially outwardly so that the cam surfaces 102 and 104 are drawn between the rollers 82 and 84 in a manner which causes the actuating discs to rotate relative to each other and thereby energize the brake unit.

It is important to note that in order to reduce the overall width or thickness of the brake unit, the ball seats 60 and 62 and the actuating balls 64 are formed so that the actuating discs 52 and 54 are quite close together when they are in their fully retracted positions, as shown best in FIG. 3. Furthermore, the actuating discs and the actuating wedge or cam member 90 are formed in the particular manner shown best in FIGS. 2, 3 and 6-10, so that they require a minimum of space. More specifically, the arrangement is such that the rollers 82 and 84 will be largely axially offset from each other, as shown best in FIG. 2 when the actuating discs are in their fully retracted positions and therefore, a major length or body portion 106 of the cam member 90 is twisted or diagonally disposed with respect to the axis of the pin 92 so as to offset the cam surfaces 102 and 104 with respect to each other and present them for engagement with the rollers 82 and 84. In addition, the peripheries of the actuating discs 52 and 54 and the ears 74 and 76 extending therefrom are diagonally relieved as indicated at 108 and 110 respectively for providing clearance for the diagonally disposed portion of the cam member 90. While the main body portion 106 of the cam member 90 is diagonally disposed, it is to be noted that the cam surfaces 102 and 104 are formed so that they always engage the rollers with line contact and the lines of contact at any given radial position of the cam member are parallel to each other and to the axes of the rollers.

The actuating discs 52 and 54 are centrally supported within the housing by means of lugs 112 and 114 formed integrally with the housing member 28 and a cylindrical pin 116 which is fixed between the housing members 26 and 28. End surfaces of the lugs 112 and 114 are arcuately formed and finished for sliding engagement with arcuate finished surfaces 118 and 120 on the periphery of the actuating disc 52 and also surfaces identical to the surfaces 118 and 120 on the disc 54. Additional arcuate surfaces 122 and 124 are provided on the discs 52 and 54, as shown in FIGS. 1, 3 and 7, which additional arcuate surfaces are disposed for cooperative engagement with the pin 116.

The actuating discs 52 and 54 also include ears or lugs 126 and 128 respectively engageable with opposite sides of the pin 116. Thus, the pin 116 serves to limit rotation of the actuating discs relative to the housing means during a braking operation. More particularly, the pin acts as a stop preventing rotation of the disc 52 in a counterclockwise direction, as viewed in FIG. 1 and alternatively, as a stop preventing rotation of the disc 54 in a clockwise direction, as viewed in FIG. 1.

Assuming the shaft 22 to be rotating in a counterclockwise direction as viewed in FIG. 1, a braking operation may be accomplished in the following manner. The lever 96 is actuated manually or in any other desired manner so as to pull the link 94 and the actuating wedge or cam member 90 downwardly. As the result, the actuating discs will be rotated relative to each other so that they are caused to spread apart and move into engagement with the rotating friction disc assemblies 40 and 42. The friction disc assembly 40 tends to drive or rotate the actuating disc 52 therewith and in a counterclockwise direction in this example, but the actuating disc 52 is fixed against such rotation by the pin 116. The actuating disc 54, on the other hand, is free, as far as the pin 116 is concerned, to rotate in a counterclockwise direction as the result of the torque applied thereto by the friction disc assembly 42 and this torque combines with the force applied by the wedge member 90 in energizing the brake unit for accomplishing the braking operation. It will be appreciated that the actuating discs 52 and 54 would function in a reverse manner when the shaft 22 is rotating in a clockwise direction rather than a counterclockwise direction, as viewed in FIG. 1.

It is important to note that in accordance with a feature of the present invention, the pin 116 comprises the only means transmitting the torque between the actuating discs and the housing means regardless of the direction of rotation of the shaft and furthermore, that the pin is located substantially diametrically oppositely from the actuating wedge or cam member 90. It has been found that this arrangement greatly enhances the operating characteristics of the brake unit as compared with previously proposed structures. It appears that with structure there will be a substantially uniform pressure between the friction disk assemblies and their cooperating friction surfaces entirely around the friction disc assemblies. It is believed that this even distribution of the braking pressure accounts for the substantially improved braking action which is obtained with a given force applied to the actuating lever 96 and substantial reductions in wear of the friction material and heat which is generated during a braking operation. The even distribution of the braking pressure around the discs also prevents a localized build-up pressure on one or more of the balls which would cause undue wear or deforming of the associated ball seats.

In order to minimize any noise which may occur during the operation of the brake unit, means is provided for maintaining the lug of the actuating disc most likely to egage the pin 116 in constant engagement with the pin. Assuming the normal direction of rotation of the shaft 22 to be in a counterclockwise direction as viewed in FIG. 1, the above mentioned means is provided for maintaining the lug 126 in engagement with the pin 116. This means comprises a wire spring 130 having a looped intermediate portion and one hooked end portion 132 snapped into a groove 134 formed in the pin 116. An opposite end 136 of the spring is hooked into an aperture 138 provided in the lug 126. It will be noted that the lug 128 is provided with an aperture 140 identical to the aperture 138 so that if the requirements of a particular installation should be difficult, the spring may be connected to the lug 128 rather than the lug 126.

It is apparent that when the brake structure is energized, the actuating discs will move axially relative to the pin 116. More particularly, one of the lugs 126 or 128, depending on the direction of rotation of the shaft 22, will slide along the pin. In order to facilitate such sliding action and thereby reduce friction losses and the power required to actuate the brake, the peripheral surface of the pin 116 is tapered from the central groove 134 toward both ends as shown in FIGS. 3 and 5.

As shown in FIGS. 1 and 7 the actuating discs 52 and 54 are respectively provided with additional lugs 142 and 144 circumferentially spaced from the lugs 126 and 128. It will be noted that the lug 142 presents a radially extending abutment surface facing oppositely from the abutment surface of the lug 126 and similarly the lug 144 presents a radially extending abutment surface facing oppositely from the abutment 128. The abutments 142 and 144 are disposed so that they are normally respectively adjacent to but spaced from the lugs 114 and 112 of the housing. However, when the parts of the brake structure and particularly the friction disc assemblies become worn after extended use, the lugs 142 and 144 may selectively be engaged with the housing lugs 114 and 112 during a braking operation so as to limit further relative rotation of the actuating discs. The arrangement is such that relative rotation of the actuating discs will be stopped before the actuating wedge or cam member 90 can be pulled completely out from between the rollers 82 and 84. Thus, complete failure of the brake structure is positively prevented and engagement of either of the lugs 142 or 144 with its associated housing lug or stop 114 or 112, will provide the operator with indication that the friction discs are worn and need replacement.

While the preferred embodiment of the present invention has been shown and described herein, it is obvious that many structural details may be changed without departing from the spirit and scope of the appended claims.

The invention is claimed as follows:

1. A disc type brake structure comprising means for providing friction surface means around an axis of a part of a machine in which the brake structure is to be installed with said means and said part being relatively rotatable, friction disc means disposed adjacent said friction surface and connectable to said part of said machine for axial and nonrotative movement relative to said part, a pair of actuating discs disposed adjacent said friction disc means and rotatably and axially shiftable relative to each other, means between said actuating discs for spreading said actuating discs upon relative rotation thereof for urging said friction disc means against said friction surface means, actuating wedge means presenting oppositely facing surfaces disposed adjacent the periphery of said actuating discs and shiftable radially thereof, a pair of follower means respectively on said actuating discs and engageable with said oppositely facing wedge means surfaces for causing relative rotation of the actuating discs upon radial movement of said wedge means, and a fixed pin located adjacent and extending transversely of said actuating discs and positioned generally diametrically oppositely from said wedge means, said discs including oppositely facing abutment surfaces selectively engageable with opposite sides of said pin for limiting rotation of the actuating discs, said pin providing substantially the only means for absorbing braking torque during a braking operation.

2. A disc type brake structure comprising means for providing friction surface means around an axis of a part of a machine with which the brake structure is to be installed with said means and said part being relatively rotatable, friction disc means disposed adjacent said friction surface and connectable to said part of said machine for axial and nonrotative movement relative to said part, a pair of actuating discs disposed adjacent said friction disc means and rotatably and axially shiftable relative to each other, means between said actuating discs for spreading said actuating discs upon relative rotation thereof for urging said friction disc means against said friction surface means, means for applying an actuating force to said actuating discs substantially at one location circumferentially of said actuating discs and including oppositely disposed ear means on said discs and means engageable with and shiftable between said ear means for urging said ear means and the discs relatively in opposite directions, and fixed means located generally diametrically oppositely from said force applying means, said discs including oppositely disposed lug portions selectively engageable with opposite sides of said fixed means for limiting rotation of the actuating discs, and said fixed means providing substantially the only means for limiting rotation of the actuating discs about their own centers and for absorbing braking torque during a braking operation.

3. A disc type brake structure comprising means for providing friction surface means around an axis of a part of a machine with which the brake structure is to be installed with said means and said part being relatively rotatable, friction disc means disposed adjacent said friction surface and connectable to said part of said machine for axial and non-rotative movement relative to said part, a pair of actuating discs disposed adjacent said friction disc means and rotatably and axially shiftable relative to each other, means between said actuating discs for spreading said actuating discs upon relative rotation thereof for urging said friction disc means against said friction surface means, means for applying an actuating force to said actuating discs substantially at one location circumferentially of said actuating discs, and fixed means located generally diametrically oppositely from said force applying means, said discs including oppositely disposed lug portions selectively engageable with opposite sides of said fixed means for limiting rotation of the actuating discs, said fixed means providing substantially the only means for limiting rotation of the actuating discs about their own centers and for absorbing braking torque during a braking operation, said fixed means comprising a pin having a longitudinal axis generally parallel to a common axis of said actuating discs, said oppositely disposed lug portions respectively being engageable with opposite end portions of said pin, and said opposite end portions of said pin being oppositely tapered for facilitating movement of said lug portions thereon during a braking operation.

4. A disc type brake structure comprising means for providing friction surface means around an axis of a part of a machine with which the brake structure is to be installed with said means and said part being relatively rotatable, friction disc means disposed adjacent said friction surface and connectable to said part of said machine for axial and nonrotative movement relative to said part, a pair of actuating discs disposed adjacent said friction disc means and rotatable and axially shiftable relative to each other said actuating discs being slightly rotatable relative to each other and being axially shiftable relative to each other from retracted positions to and from laterally extended positions, said actuating discs being spaced from each other not in excess of a predetermined small amount when they are in said retracted positions, an actuating wedge presenting oppositely facing surfaces having a width substantially greater than said small predetermined amount of spacing, said wedge being disposed adjacent the periphery of said actuating discs and shiftable radially thereof, a pair of follower means respectively on said actuating discs and offset from each other axially of said actuating discs when said actuating discs are in said retracted positions, said wedge including a portion diagonally disposed with respect to said actuating discs for presenting said oppositely facing wedge surfaces for engagement with said offset follower means, portions of said actuating discs being relieved for accommodating said wedge, and fixed means located adjacent said actuating discs and generally diametrically oppositely from said wedge, said discs including oppositely disposed lugs selectively engageable with opposite sides of said fixed means for limiting rotation of the actuating discs, and said fixed means providing substantially the only means for absorbing braking torque during a braking operation.

5. A disc type brake structure, as defined in claim 4, wherein said follower means include parallel shafts respectively secured to said actuating discs and rollers respectively on said shafts, and said oppositely facing wedge surfaces being disposed for engaging said rollers with line contact.

6. A disc type brake structure comprising a first pair of aligned rotatable discs, a second pair of actuating discs disposed between said engageable with said first discs, said actuating discs being rotatable and axially shiftable relative to each other for braking engagement with and disengagement from said first pair of discs, means between said actuating discs for spreading said actuating discs upon relative rotation thereof, wedge means disposed adjacent the periphery of the actuating discs and shiftable radially thereof, a pair of follower means respectively on said actuating discs and engageable with opposite edges of said wedge means for relatively rotating said actuating discs on radial movement of the wedge means, and fixed means located generally diametrically oppositely from said wedge means, said discs including oppositely disposed lug means selectively engageable with opposite sides of said fixed means for limiting rotation of the actuating discs, and said fixed means providing substantially the only means for absorbing braking torque during a braking operation, said fixed means comprising an elongated pin disposed substantially parallel to a common axis of said discs, portions of said pin being tapered for facilitating movement of the lugs along the pin during braking operations.

7. A disc type brake structure, as defined in claim 6, wherein said follower means include parallel stub shafts respectively secured to said actuating discs, and rollers including antifriction bearing means on said stub shafts.

8. A disc type braking structure, as defined in claim 6, which includes additional fixed means selectively engageable with said actuating discs for limiting rotation of the actuating disc which is unrestrained by said first mentioned fixed means and thereby limiting the amount of relative rotation which may take place between said actuating discs and positively preventing disengagement of the actuating wedge member from said follower means.

9. A disc type braking structure comprising a first pair of aligned rotatable discs, a second pair of actuating discs disposed between and engageable with said first discs, said actuating discs being rotatable and axially shiftable relative to each other for braking engagement with and disengagement from said first pair of discs, means between said actuating discs for spreading said actuating discs upon relative rotation thereof, wedge means disposed adjacent the periphery of said actuating discs and shiftable radially thereof, a pair of follower means respectively on said actuating discs and engageable with opposite edges of said wedge means for relatively rotating said actuating discs on radial movement of the wedge means, fixed means located generally diametrically oppositely from said wedge means, said discs including oppositely disposed lug means selectively engageable with opposite sides of said fixed means for limiting rotation of the actuating discs, said fixed means providing substantially the only means for absorbing braking torque during a braking operation, said actuating discs being normally spaced apart not greater than a predetermined small distance, said follower means being offset axially of the discs relative to each other with the follower means on each actuating disc being at least partially located over the periphery of the other actuating disc, said wedge means having a thickness substantially greater than said predetermined small distance and including at least a portion diagonally disposed with respect to the axis of said discs for simultaneous engagement with said offset follower means, and portions of said actuating discs being relieved for accommodating said wedge means.

10. A disc type brake structure comprising housing means including a pair of spaced apart opposing annular friction surfaces adapted to surround a part of a machine with which the brake structure is to be installed with said housing means and said part being relatively rotatable, a pair of friction disc means disposed between and respectively adjacent said friction surfaces and connectable to said part of said machine for axial and nonrotative movement relative to said part, a pair of actuating discs disposed between said friction discs and rotatable and axially shiftable relative to each other, said actuating discs being axially shiftable to and from retracted positions in which the actuating discs are spaced no more than a predetermined small distance from each other, means between said actuating discs for spreading said actuating discs upon relative rotation thereof, actuating wedge means presenting oppositely facing cam surfaces disposed adjacent the periphery of said actuating discs and shiftable radially thereof, said actuating discs respectively including ear portions projecting outwardly at opposite sides of said wedge, rollers respectively carried by said ears, said rollers being axially offset with respect to each other with the roller on each ear of each actuating disc substantially overlying the periphery of the other actuating disc, said wedge having a thickness substantially greater than said predetermined small distance between said actuating discs and being diagonally disposed for presenting said oppositely facing cam surfaces for engagement with said offset rollers, portions of said actuating discs being relieved for avoiding interference with said wedge, a fixed pin located adjacent the periphery of said actuating discs and generally diametrically oppositely from said wedge, said actuating discs including lugs respectively engageable with opposite sides of said pin, and said pin providing substantially the only means for absorbing braking torque during a braking operation.

11. A disc type brake structure, as defined in claim 10 which includes resilient means for normally maintaining at least one of said actuating disc lugs engageable with said pin.

References Cited in the file of this patent

UNITED STATES PATENTS

| | | |
|---|---|---|
| 2,387,039 | Parrett | Oct. 16, 1945 |
| 2,743,791 | Asburry | May 1, 1956 |
| 2,883,008 | Lucker | Apr. 21, 1959 |